United States Patent Office 3,539,321
Patented Nov. 10, 1970

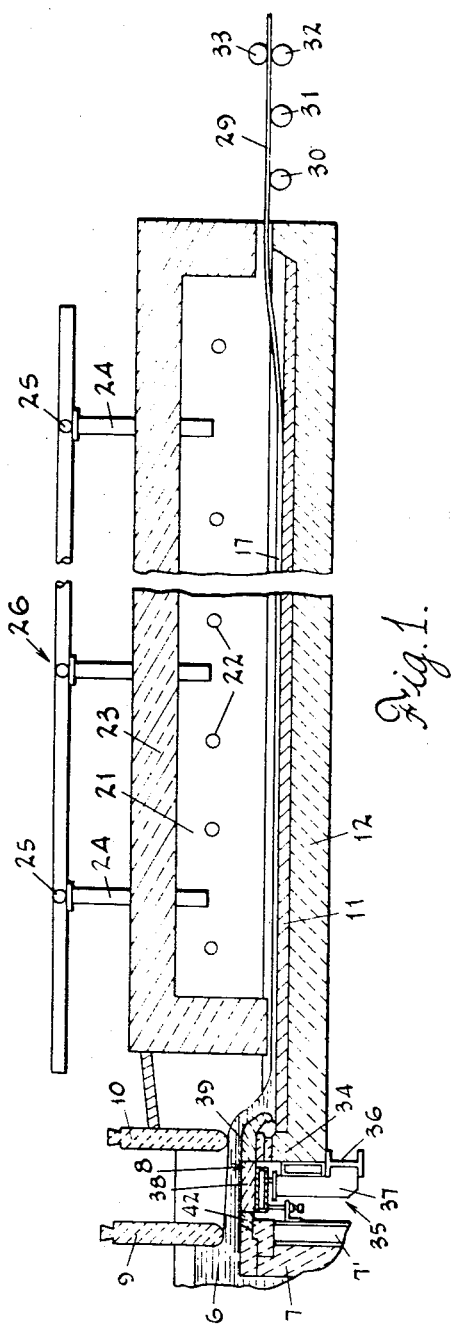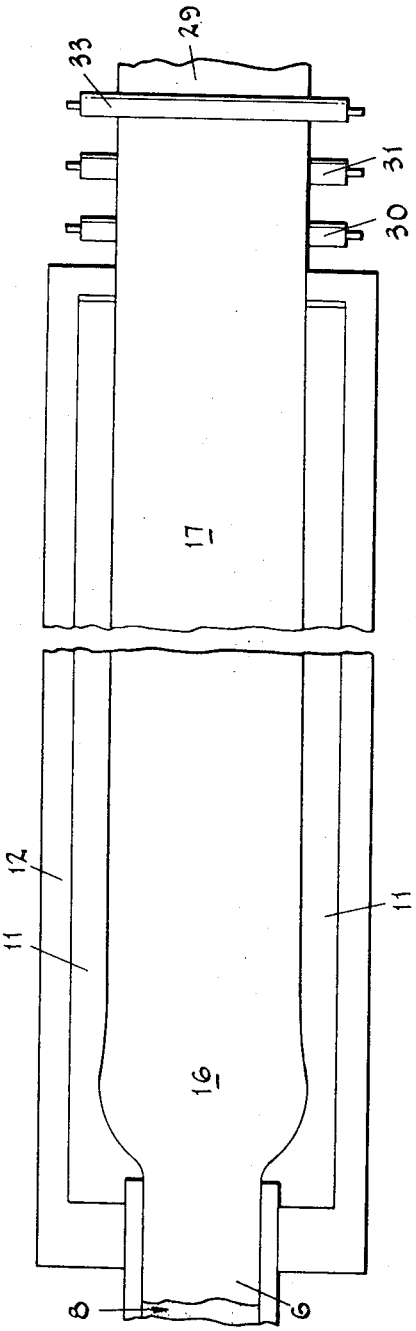

3,539,321
METHOD AND APPARATUS FOR SUPPORTING FLOAT GLASS SPOUT AND BATH TANK
Eldwin C. Montgomery, Modesto, Calif., and Francis L. Swillinger, Perrysburg, Ohio, assignors to Libbey-Owens-Ford Glass Company, Toledo, Ohio, a corporation of Ohio
Filed Jan. 2, 1968, Ser. No. 695,112
Int. Cl. C03b 18/02
U.S. Cl. 65—99                   9 Claims

ABSTRACT OF THE DISCLOSURE

Method of and structure for supporting the spout, lip and bath tank, relative to the furnace, in apparatus for producing float glass; which involves supporting the spout and bath tank as a unit in operative relation to the furnace on a first unitary supporting structure which is separate from a second supporting structure for the furnace; and which may also involve heating the apparatus to working temperature, and then fitting an expansion block into a space provided between the spout and the furnace, before supplying glass to the bath over the spout.

BACKGROUND OF THE INVENTION

Field of the invention

The present invention relates broadly to the manufacture of float glass and more particularly to a method of and apparatus for initially supporting the spout, lip and bath tank of a float glass producing apparatus in operative relation to the furnace and in a manner to prevent displacement of said spout and lip from their desired operative positions when the apparatus is heated to working temperature.

Description of the prior art

A conventional form of float glass forming apparatus is illustrated and described in U.S. Pat. No. 3,083,551, granted Apr. 2, 1963, and, as there explained, the manufacture of flat glass by the float process involves delivering glass at a controlled rate onto a bath of molten metal (such as tin) and advancing it along the surface of the bath under physical and thermal conditions which assure (1) that a layer of molten glass will be established on the bath, (2) that the glass in the layer can flow laterally unhindered to develop on the surface of the bath a buoyant body of molten glass of stable thickness, and (3) that the buoyant body in ribbon form will be continuously advanced along the bath and sufficiently cooled as it advances to permit it to be taken unharmed out of the bath by mechanical conveying means.

As illustrated in FIGS. 6 and 7 and described in column 7, lines 15 to 22, of the patent, glass is supplied in molten form from the melting furnace, and the spout over which it flows is on the forehearth of the furnace. This is common practice in the float glass art and, even when the spout has not been directly connected to or formed on the furnace, it has heretofore been customary and deemed desirable to support the spout on metal supporting structures independently of the tank containing the float bath of molten metal; although, as indicated in lines 23 to 29 in column 7 of the patent, the importance of maintaining the spout lip at a definite predetermined distance from the end wall of the bath tank has been realized.

However, with the prior art structures, and regardless of how exactly the spout and bath were located in relation to one another during building of the apparatus, when the spout was formed on or supported with the forehearth of the furnace, or when the spout was mounted and supported independently of both the furnace and bath tank, objectionable displacement of the spout relative to the end wall of the bath tank always occurred during subsequent operation of the apparatus. Moreover, serious leakage problems were encountered between the spout and furnace when attempts were made to support the spout independently of the furnace.

SUMMARY

According to the present invention, the problem of the spout becoming displaced relative to the bath tank is overcome, leakage of molten glass in the furnace-spout area is prevented, and in addition the possibility of objectionable cooling in the spout lip area is eliminated by mounting the spout and bath tank as a unit, by the provision of special mounting structures, and by an improved lip, spout and expansion block arrangement.

It is, therefore, a primary object of the invention to mount the spout in relation to the furnace and bath tank in a manner that will avoid objectionable displacement of the spout relative to the bath tank end wall during use.

Another object is to provide a unitary mounting structure, separate from the furnace mounting structure, which functions as a common support for the spout and bath tank.

Another object is the provision of an improved spout assembly through and over which molten glass flows from the furnace to the float bath.

Still another object is to provide, in a spout assembly of this character, an improved form of expansion block and to fit the same into position between the main body of the spout and the furnace to provide a substantially leak-proof passageway for the molten glass flowing from the furnace to the float bath.

Further objects and advantages of the invention will become apparent during the course of the following description, when taken in connection with the accompanying drawings.

BRIEF DESCRIPTION OF THE DRAWINGS

In the drawings, wherein like numerals refer to like parts throughout:

FIG. 1 is a longitudinal, vertical, sectional view through a representative form of float glass producing apparatus;

FIG. 2 is a plan view of the apparatus of FIG. 1, with the plenum chamber removed;

DESCRIPTION OF THE PREFERRED EMBODIMENTS

Figure 3:
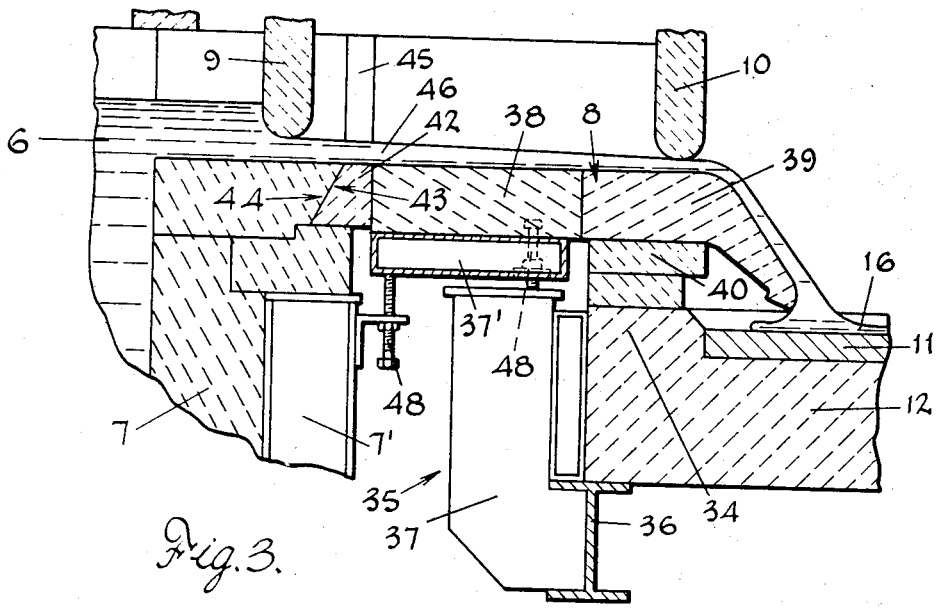
FIG. 3 is an enlarged, fragmentary view of the furnace-spout-bath tank areas of FIG. 1, illustrating a preferred form of the structural and mounting features of the invention.
Figure 4:
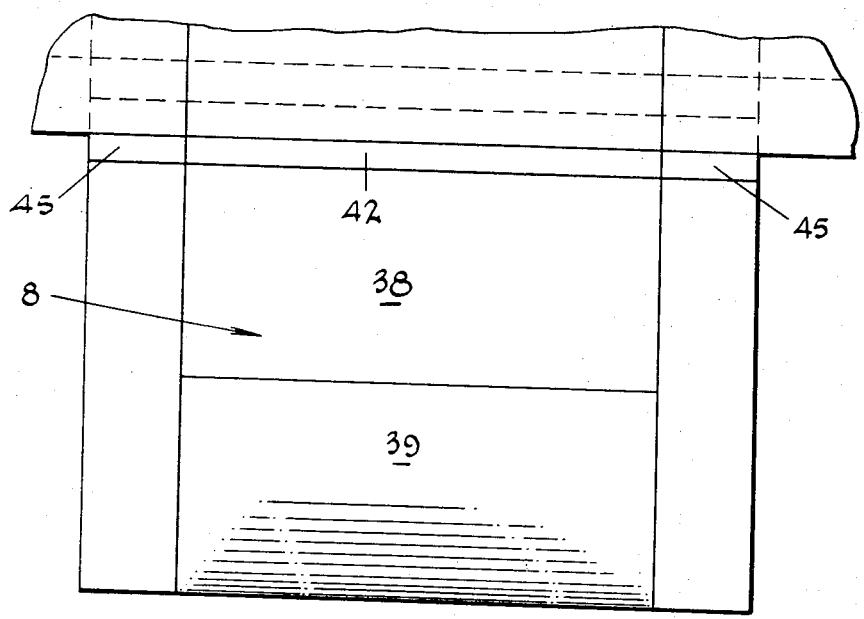
FIG. 4 is a plan view of the apparatus of FIG. 3.

Referring now more particularly to the drawings there is illustrated in FIGS. 1 and 2 a typical float glass machine similar to the one disclosed in U.S. Pat. 3,083,551. In this apparatus molten glass 6 is supplied from the forehearth of a glass melting furnace 7 through and over a spout assembly 8 in an amount regulated and controlled by a tweel 9 and a gate 10.

The glass flows from the spout 8 onto a relatively wide metal bath 11, contained in a tank 12, to form a buoyant body of molten glass, indicated at 16, and a buoyant layer of stable thickness 17 develops in ribbon form therefrom.

The metal bath 11 in the tank 12, and the head space 21 over the bath are heated by radiant heat directed downwardly from heaters 22 and the head space 21, which contains the "float atmosphere," is enclosed by a roof structure usually referred to as a plenum chamber 23 which makes it possible to maintain a sufficient volume of protecting gas over that part of the metal bath 11 that is exposed at each side of the glass in the float chamber. The roof structure 23 is provided at intervals with ducting 24 connected by branches 25 to headers 26 through which the protecting gas is fed into the head space 21 at a rate to create a plenum therein. The protecting gas is one which will not chemically react with the metal in the bath 11 to produce contaminants of the glass (for example, it may be a mixture of nitrogen and hydrogen) and, by providing a plenum ingress to the head space 21, entrance of atmospheric air is theoretically prevented.

When the ultimate ribbon 29 is to be of substantially the same thickness as the equilibrium or stable thickness of the glass the temperature of the glass in the buoyant layer or ribbon 17 is controlled so as to progressively cool it from the tweel 9 to the discharge end of the apparatus by which time the ribbon surface should reach a temperature at which it is sufficiently stiffened to allow its transfer to a lehr on mechanical conveying means without detriment to the surfaces.

One type of mechanical conveying means that can be used includes supporting rollers 30 to 32 and superimposed roller 33 mounted outside of the discharge end of the tank. Any or all of the rollers 30 to 33 may be driven and cooperate to apply a tractive effort to the ribbon of glass moving towards the outlet end sufficient to advance it along the bath; and, when a ribbon of less than equilibrium thickness is desired, this can be obtained by increasing the speed of the rollers 30 to 33 and thereby modifying their tractional effort and attenuating the molten glass body 17 of stable thickness.

It will be appreciated from this that a critical area of the float glass forming apparatus is around the forward or entrance area of the bath tank where the ribbon 17 of glass that ultimately becomes the finished float glass product develops from the buoyant body 16 and, as has been pointed out above, the maintenance of an initial and carefully predetermined positional relationship between the spout assembly 8 and the end wall 34 of the tank 12 is of major importance to the proper development and ultimate quality of the ribbon 17 to be advanced over the bath of molten metal 11.

One basis for the present invention is the discovery that considerable relative movement takes place between the furnace and bath tank, as a result of the expansion, especially in their independent metal supporting structures, during heating of the float apparatus to the working temperatures; and that this is compounded by the observed fact that the furnace structure tends to "grow" downstream, while the bath tank tends to "grow" upstream, after the apparatus has been built with the essential elements accurately positioned and while it is being heated to the required working temperatures.

A more important basis of the invention is the further discovery that objectionable displacement of the spout relative to the end wall 34 of the bath tank 12 during operation of the float glass apparatus results from expansion and can be effectively prevented by mounting the spout and bath tank on a common unitary metal supporting structure or, in other words, by mounting these two elements as a unit, independently of the furnace, instead of mounting them independently of each other or with the spout on the furnace as had heretofore been done.

However, in actual commercial practice, it has been found that mounting the spout independently of the furnace sometimes results in leakage of molten glass in the furnace-spout area and the invention, accordingly, contemplates combining an improved supporting means with an improved spout assembly construction to overcome the leakage as well as the spout shifting problem.

To this end, the furnace 7 is mounted on a conventional metal supporting structure 7' while a separate unitary metal supporting structure, designated in its entirety by the numeral 35, provides a common support for the bath tank 12 and at least the main body portion of the spout assembly 8.

Conveniently, the tank supporting portion 36 of the unitary structure 35 may be of a conventional welded I-beam frame type commonly employed for this purpose and the spout supporting portion 37 comprises a substantially L shaped bracket, welded to or otherwise unitarily joined on the frame 36, and provided with a hollow spout carrying structure 37'.

In this way, the spout and bath tank are mounted as a unit and "growth" thereof under heat will not create objectionable relative movement between them when their common metal supporting structure expands under heat.

Further in this connection, the spout assembly of a float glass forming apparatus conventionally includes a main body portion and a lip portion over which the molten glass flows onto the float bath. In U.S. Pat. No. 3,083,551, this lip portion is formed on and is simply an extending part of the main body of the spout, which in turn is a part of the forehearth of the furnace.

However, in accordance with this invention, the spout is mounted independently of the furnace and the lip portion of the spout assembly is preferably, although not necessarily, a separate member positioned in abutting relation to the main body of the spout. Thus, as illustrated in FIG. 3 the spout assembly 8 comprises a main body portion or member 38 and a separate lip member 39. As there shown, the lip 39 is supported directly on the end wall 34 of the bath tank by a refractory block or blocks 40 so that the entire spout assembly 8 and the bath tank 12 are supported as a unit and no cooling of the spout structure is required. This latter point is important because previous attempts to support the spout independently of the furnace were deemed to necessitate the use of a water cooled member in the area between the spout lip and the bath tank that objectionably chilled the glass and the bath.

Also, as indicated above, earlier attempts to mount the spout independently of the furnace resulted in leakage of glass in the furnace-spout area. With the mounting and spout structures of the present invention, however, this problem is overcome, a tight joint between the furnace and spout is maintained and provision is made to prevent any displacement of the spout, relative to the bath tank, that might result from the normal tendency of the furnace to "grow" downstream and the tank-spout assembly to "grow" upstream as their respective metal supporting structures expand.

Thus, it is theoretically possible to anticipate the distance that the furnace and spout-tank assembly will "grow" toward each other under heat and, in building the furnace, to space them apart just enough to cause them to "grow" together when the apparatus reaches its working temperature.

However, this invention contemplates a simpler and much more exact procedure for achieving the desired result. To explain, in building or rebuilding the float apparatus the furnace and spout-tank assembly are located with more than adequate space therebetween to take care of any possible tendency to "grow" toward each other under heat. A supply of molten glass is then built up and retained in the furnace and the entire apparatus is heated up to working temperature. Sufficient time is allowed for the furnace and spout-tank assembly to attain maximum "growth" and a so-called expansion block 42 (FIG. 3) is then cut and fitted into the remaining space therebetween.

The expansion block 42, which is preferably of a refractory material, is associated with and can form part of the spout assembly 8. To prevent any tendency for it to float toward the surface of the molten glass flowing toward and through the spout, at least one surface of the block 42 is cut at an angle as shown at 43 to give a dove tail effect and fit an oppositely cut surface or surfaces on the furnace and/or spout as indicated at 44. When this type of expansion block is employed in the bottom, it can be slid and fitted into place from one side or the other of the float apparatus and corresponding blocks 45 are fitted itno the spaces between the side walls of the furnace and spout.

Upon completion of this procedure, a substantially glass tight passage will be provided through which a stream of molten glass 46 is permitted to flow from the furnace 7 to the float bath 11.

Figure 5:
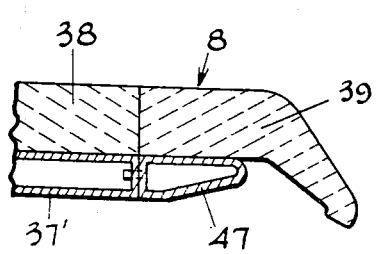
FIG. 5 is a view, similar to FIG. 3, illustrating a modified form of supporting structure.

In lieu of supporting the lip 39 directly on the end wall 34 of the bath tank 12 by the use of blocks 40, the lip may be supported on an extension of the spout carrying structure 37' which may be a hollow box-like member 47 (FIG. 5) secured thereto. In this case, the member 47, or other extended portion of the carrying structure 37' is made of a heat resisting metal such as an aluminum-molybdenum alloy which does not require water cooling at float glass operating temperatures.

Also, while the common, unitary supporting structure for the spout assembly and the bath tank is essentially separate and independent of the supporting structure for the furnace, it may be tied thereto, in any desired manner that will not prevent realtive expansion, or after the apparatus has been heated to working temperature or beyond the point where further expansion will take place, and leveling or adjusting devices such as shown at 48 can be provided wherever necessary or desirable on the furnace and/or spout supporting structures to permit accurate positioning without interfering with relative expansion of the parts.

In any event, it is to be understood that the forms of the invention herein shown and described are to be taken as illustrative embodiments only of the same, and that various changes in the shape, size and arrangement of parts, as well as various procedural and compositional changes may be resorted to without departing from the spirit of the invention as defined in the following claims:

We claim:

1. In a method of preparing for operation a relatively cool nonoperating float glass producing apparatus including a furnace for supplying molten glass, a tank beyond said furnace and containing a bath of molten metal upon which glass from said furnace is floated, and a spout over which glass is supplied from said furnace to said bath, the improvement comprising the steps of initially supporting said spout and said tank as a unit in operative relation to and independently of said furnace, heating said apparatus to working temperature whereby said spout and tank expand as a unit toward said furnace, and supplying glass to said tank from said furnace through said spout.

2. A method as defined in claim 1, comprising supporting said spout in spaced relation to said furnace, and fitting an expansion block into the space between said spout and said furnace after heating said apparatus to working temperature and before supplying glass to said bath through said spout.

3. In apparatus for producing float glass including a furnace containing a mass of molten glass, a tank beyond said furnace and containing a bath of molten metal upon which glass from said furnace is floated, a plenum chamber confining a float atmosphere above said bath, and a spout between said furnace and said tank over which molten glass is supplied from said furnace to said metal bath, the improvement comprising a first unitary supporting structure underlying and connecting said spout and bath tank as a unit in operative relation to each other and to said furnace, and a second supporting structure for said furnace separate from said first supporting structure.

4. Apparatus as defined in claim 3, in which said spout and said furnace are supported in spaced relationship, and which also includes an expansion block fitted in place between said spout and said furnace after said apparatus is heated to working temperature.

5. Apparatus as defined in claim 3, which includes means carried by at least one of said supporting means for adjusting the position of said spout relative to said furnace.

6. Apparatus as defined in claim 3, in which said first unitary supporting means includes a frame portion upon which said tank rests, and a generally L-shaped bracket portion extending upwardly from said frame portion and carrying said spout.

7. Apparatus as defined in claim 6, in which said spout is an assembly including a lip member, and including means for supporting said lip member on said tank.

8. Apparatus as defined in claim 6 in which said spout is an assembly including a lip member, and said L-shaped bracket includes a generally horizontal extension upon which said lip member rests.

9. In apparatus for producing float glass including a furnace containing a mass of molten glass, a tank beyond said furnace containing a bath of molten metal upon which glass from said furnace is floated, a plenum chamber confining a float atmosphere above said bath, and a spout between said furnace and said tank over which molten glass is supplied from said furnace to said metal bath, the improvement comprising a first unitary supporting structure underlying and connecting said spout and said bath tank as a unit in operative relation to each other and to said furnace, and a second supporting structure for said furnace, said first unitary supporting structure for said spout and said bath tank being separate from said second furnace supporting structure, said first supporting structure including a frame portion upon which said tank rests and a generally L-shaped bracket portion extending upwardly from said frame portion and carrying said spout, said spout comprising an assembly including a lip member, and said L-shaped bracket including a box-like portion upon which said spout rests and a generally horizontal box-like extension upon which said lip member rests.

References Cited

UNITED STATES PATENTS

| 1,761,190 | 6/1930 | Brown | 65—339 |
| 3,083,551 | 4/1963 | Pickington | 65—99 |
| 3,298,814 | 1/1967 | Mambourg | 65—335 |
| 3,305,339 | 2/1967 | Plumat | 65—99 |

S. LEON BASHORE, Primary Examiner

E. R. FREEDMAN, Assistant Examiner

U.S. Cl. X.R.

65—65, 135, 182